US012737277B1

(12) United States Patent
Aggarwal et al.

(10) Patent No.: US 12,737,277 B1
(45) Date of Patent: Sep. 15, 2026

(54) APPLICATION FEATURE DEVELOPMENT TOOL

(71) Applicant: Intuit Inc., Mountain View, CA (US)

(72) Inventors: Anmol Aggarwal, Mountain View, CA (US); Rodrigo Antonio Hernandez Hernandez, San Francisco, CA (US); Joseph Pliskin, San Diego, CA (US); Monica Lizet Aviles, San Diego, CA (US); Catherine Scanlon, San Diego, CA (US); Saurabh Sangwan, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/284,344

(22) Filed: Jul. 29, 2025

(51) Int. Cl.
*G06F 11/3604* (2025.01)

(52) U.S. Cl.
CPC ................................ *G06F 11/3608* (2013.01)

(58) Field of Classification Search
None
See application file for complete search history.

(56) References Cited

U.S. PATENT DOCUMENTS 10,671,932 B1 * 6/2020 Chen ........................ G06N 5/04
11,503,061 B1 * 11/2022 Lin ....................... H04L 63/102
2021/0294588 A1 * 9/2021 Gupta ..................... G06F 21/50
2021/0374033 A1 * 12/2021 Yang ................... G06F 11/3452
2022/0035882 A1 * 2/2022 Atluri ................. G06F 9/45558
2024/0428122 A1 * 12/2024 Sharpe ................... G06N 20/00
2025/0315254 A1 * 10/2025 Boué ...................... G06N 20/00

FOREIGN PATENT DOCUMENTS

CN 119313429 A * 1/2025 ............... G06N 3/08
WO WO-2022240857 A1 * 11/2022 ............ G06N 20/00

OTHER PUBLICATIONS

Salleh et al., Feature Selection Techniques for Enhancing App User Review Analysis (Year: 2025).*

* cited by examiner

*Primary Examiner* — Insun Kang
(74) *Attorney, Agent, or Firm* — Lathrop GPM LLP

(57) ABSTRACT

A method includes identifying a multitude of application features of a section of a target application. The method further includes generating a multitude of feature impact scores for the multitude of application features. The multitude of feature impact scores each represent a corresponding impact of a respective feature of the multitude of application features on a conversion of a user journey of the target application. The method further includes retrieving a multitude of user reviews of the multitude of application features. The method further includes generating, by a large language model (LLM) processing the multitude of feature impact scores and the multitude of user reviews, a hypothesis of impacts of respective application features of the multitude of application features on the conversion. The method further includes displaying the hypothesis, the multitude of application features, and the multitude of feature impact scores.

18 Claims, 4 Drawing Sheets

420
NETWORK
422
NODE X
424
NODE Y
426
CLIENT DEVICE

APPLICATION FEATURE DEVELOPMENT TOOL

BACKGROUND

Software applications and services may guide users through complex, multi-step workflows, referred to as user journeys. From the application perspective, the user journey is a series of user interface screens that guide the user through performing a task. From the user perspective, the user journey is a series of user interactions with multiple sections of a software application or service. Each section may include one or more application features that influence user behavior and outcomes. If the application features are complex or nonintuitive, the user may stop using the application. User conversion may be defined as the successful completion of a user journey, in which the intended positive outcome of the user journey is achieved.

Experimental feature development and testing may be used to evaluate the addition and deletion of existing and new application features. In testing features, challenges may arise due to the diversity of users and the complexity of application feature interactions.

SUMMARY

In general, in one aspect, one or more embodiments relate to a method. The method includes identifying a multitude of application features of a section of a target application. The method further includes generating a multitude of feature impact scores for the multitude of application features. The multitude of feature impact scores each represent a corresponding impact of a respective feature of the multitude of application features on a conversion of a user journey of the target application. The method further includes retrieving a multitude of user reviews of the multitude of application features. The method further includes generating, by a large language model (LLM) processing the multitude of feature impact scores and the multitude of user reviews, a hypothesis of impacts of respective application features of the multitude of application features on the conversion. The method further includes displaying the hypothesis, the multitude of application features, and the multitude of feature impact scores.

In general, in one aspect, one or more embodiments relate to a system. The system includes a computer processor, and a feature tool, executing on the computer processor. The system further includes a large language model (LLM), executing on the computer processor. The system further includes a transformer model, executing on the computer processor. The system further includes a feature impact model, executing on the computer processor. The system further includes a feature engine, executing on the computer processor, and configured for performing operations including receiving, from the feature tool, a multitude of application features identified from a target application. The operations performed by the feature engine further include causing the feature impact model to generate a multitude of feature impact scores for the multitude of application features. The multitude of feature impact scores each represent a corresponding impact of a respective feature of the multitude of application features on a conversion of a user journey of the target application. The feature engine is further configured for causing the transformer model to retrieve a multitude of user reviews of the multitude of application features. The feature engine is further configured for causing the LLM to process the multitude of feature impact scores and the multitude of user reviews to generate a hypothesis of impacts of respective application features of the multitude of application features on the conversion. The feature engine is further configured for causing the feature tool to display the hypothesis, the multitude of application features, and the multitude of feature impact scores.

In general, in one aspect, one or more embodiments relate to a method. The method includes obtaining a multitude of application features of a section of a target application. The method further includes transmitting the multitude of application features to a feature engine. The method further includes receiving, from the feature engine, a multitude of feature impact scores for the multitude of application features, wherein the multitude of feature impact scores each represent a corresponding impact of a respective feature of the multitude of application features on a conversion of a user journey of the target application. The method further includes receiving, from the feature engine, a multitude of user reviews of the multitude of application features. The method further includes receiving, from the feature engine, a generated hypothesis of an impact of an application feature of the multitude of application features on the conversion. The method further includes displaying the generated hypothesis, the application feature and a corresponding feature impact score, and the multitude of user reviews in a feature dashboard. The method further includes obtaining an updated multitude of application features of the section of the target application, wherein at least one application feature is disabled. The method further includes transmitting the updated multitude of application features to the feature engine. The method further includes receiving, from the feature engine, an updated multitude of feature impact scores corresponding to the updated multitude of application features. The method further includes receiving, from the feature engine, an updated hypothesis of impacts of the respective application features of the updated multitude of application features on the conversion. The method further includes displaying the updated hypothesis in the feature dashboard as a response to disabling the at least one application feature.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a feature tool that determines impact of in-application features on user conversion outcomes. The feature tool is used for experimental feature development and/or A/B testing. The feature tool, with a machine learning model, identifies a set of application features within a section of a target application and generates corresponding feature impact scores for the application features. The impact score quantifies the effect of a specific feature on a user conversion.

Further, to enhance explainability, the system retrieves user review data associated with the identified features. The system specifically identifies user review data that aligns with the magnitude and direction (e.g., positive or negative) feature impact scores of the features under consideration. The user review data that aligns with the feature impact score may be referred to as "validating reviews". The quantitative impact scores and qualitative feedback, namely, the "validating reviews", are processed by a large language model (LLM). The LLM synthesizes this information to generate a hypothesis that explains why a particular feature influences conversion, supported by the specifically identified user review data. Thus, the user review data provides "validating reviews" the hypothesis. The hypothesis, along with the features and corresponding impact scores, are presented in a visual interface of the tool, which may be a dashboard. The hypothesis may serve as a "baseline" hypothesis.

Upon presenting the baseline hypothesis, the application features of the section of the target application may be selectively enabled or disabled. The modifications may be transmitted to the feature engine, and updated feature impact scores may be determined. Based on the updated feature impact scores, the hypothesis may be modified, and presented. Thus, the feature tool provides a data-driven, interpretable and iterative framework that facilitates application managers to simulate feature changes, understand their implications, and make informed decisions to improve user experience and conversion outcomes.

Figure 1:
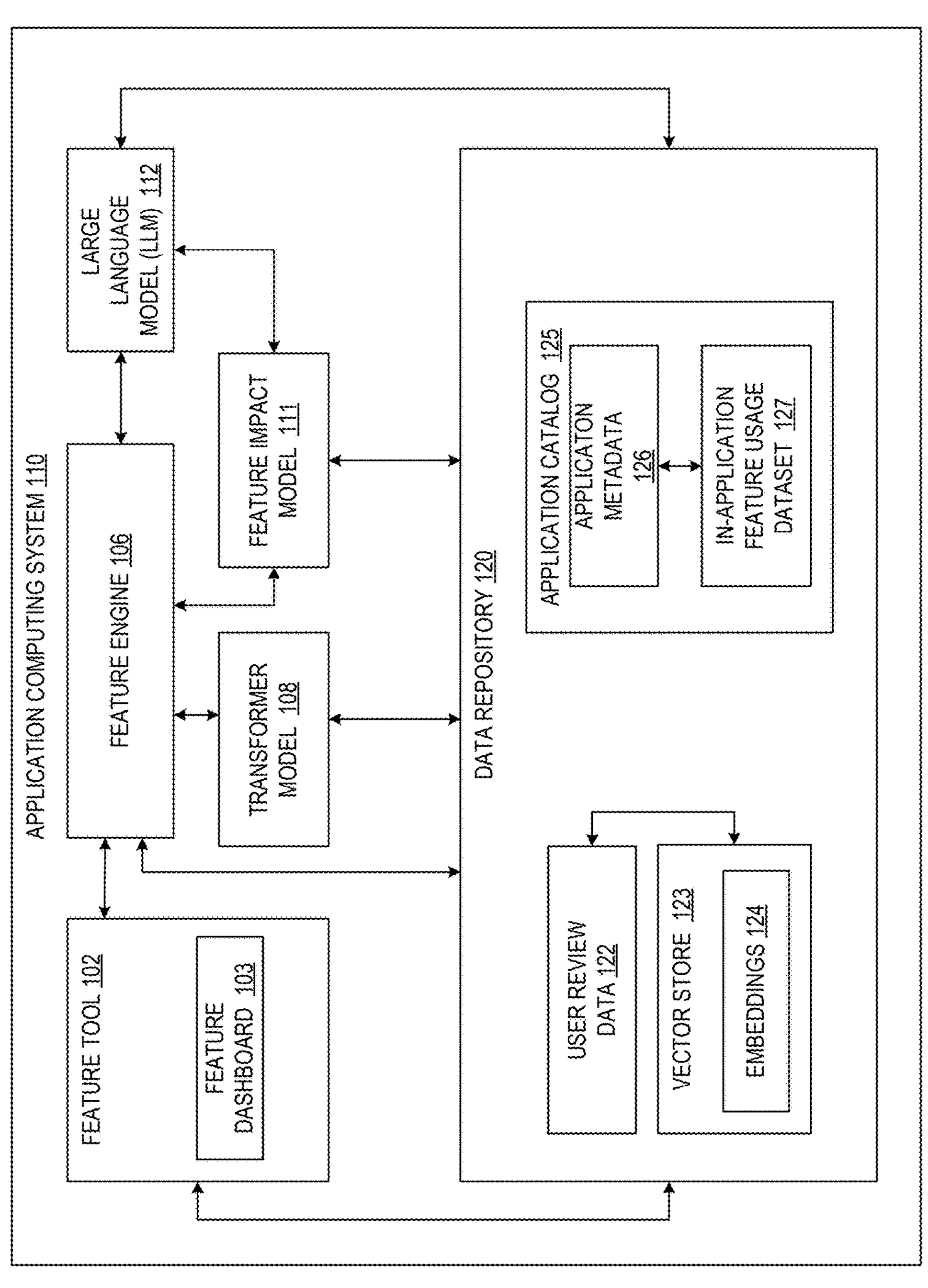
FIG. 1 shows a computing system, in accordance with one or more embodiments.

Attention is now turned to the figures. FIG. 1 shows a computing system, in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the feature tool (102), the feature engine (106), the transformer model (108), the feature impact model (111), and the large language model (LLM) (112). An example of the computer processor is described with respect to the computer processor(s) (402) of FIG. 4A. Thus, the application computing system (110) is configured to execute one or more applications, such as the feature tool (102), the feature engine (106), the transformer model (108), the feature impact model (111), and the LLM (112). An example of a computer system and network that may form the application computing system (110) is described with respect to FIG. 4A and FIG. 4B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes user review data (122). The user review data (122) is a corpus of data that includes user reviews of diverse applications that constitute the application offerings of an enterprise. The enterprise may host the application computing system (110). The diverse applications may be a multitude of software application offerings, and/or software services of the enterprise. The user review data (122) may include user reviews at the granularity of individual features of a software application offering or software service. The user review data (122) may further include answers to in-application surveys, feedback forms, etc. Additionally, the user review data (122) may include reviews of AI or human expert service providers. Thus, diverse corpora of user review data (122) pertaining to the diverse software application offerings and/or software services may be stored in the data repository (120).

The user review data (122) corpora may be indexed and stored in a vector store (123). The vector store (123) may store the corpora of user review data (122) in the form of embeddings (124). The embeddings (124) are numerical vector representations of text such as words, sentences, and documents, that capture the semantic meaning of the text in a form that is machine-understandable and that can be manipulated by machines. An embedding (124) may be a dense, fixed-size vector. Text with similar meanings may be mapped to nearby points in a vector space. Text with dissimilar meanings may be mapped to distant points in the vector space. The embeddings (124) of the user review data (122) may be generated by an embedding layer of the transformer model (108). Further, the embeddings (124) may be stored in the vector store (123). Examples of vector stores that can be used by transformer models for semantic searches include FAISS®, Pinecone®, Weaviate®, Qdrant®, Milvus®, etc. In the vector store (123), the original review text, metadata of the review (e.g., application name, review ID), may be stored along with the embedding (124).

The data repository (120) further includes an application catalog (125). The application catalog (125) includes application metadata (126) and in-application feature usage data-set(s) (127) for the diverse software application offerings and/or software services of the enterprise. The application metadata (126) may include application context that may be used for segmenting or filtering logistic regression analysis of the in-application feature usage dataset (127). For example, the application metadata (126) may include basic application information such as the application name, business domain of the application (e.g., productivity, finance, health, platform, launch date, version, etc.). The application metadata (126) may further include business and usage context of the application such as pricing model information (e.g., free, subscription, one-time purchase), target audience (e.g., small businesses, enterprises, consumers), active user base, and conversion goals. Conversion goals may include a description of what counts as a successful end state, i.e., a "conversion." A conversion may be a user sign-up, a purchase, an upgrade, a successful form processing and fees collected, successful financial transaction, etc.

The in-application feature usage dataset (127) may capture how users interact with features of the applications, and whether the users convert. An entry in the in-application feature usage dataset (127) may represent a user session, or a user-feature interaction. Examples of fields of the in-application feature usage dataset (127) include an anonymized user identifier, session identifiers, and timestamp of the interaction. Other fields may include the in-application feature identifier, feature name, number of times the feature was used, time spent using the feature, conversion (may be a binary label: 1 if converted; 0 if not converted), timestamp of when the conversion occurred, user segment type, etc.

The application computing system (110) includes a transformer model (108). The transformer model (108) is a transformer-based language model used for the semantic retrieval of user review data. The transformer model is designed to process and understand natural language by capturing contextual relationships between words in a sequence using self-attention mechanisms. The transformer architecture of the transformer model includes self-attention layers, encoder and decoder layers. Machine learning models based on transformer architectures may have advanced natural language processing capabilities. The transformer model (108) includes an embedding layer that transforms raw user review data into dense vector representations (embeddings) that capture the semantic meaning of the user review data. The embeddings are stored in the vector store (123) and may be used to perform similarity-based retrieval operations. During experimental feature analysis, a hypothesis formulated by an application manager or analyst may be converted into a natural language query. This query may be converted to an embedding using the embedding layer of the transformer model (108). The transformer model (108) may then retrieve user reviews whose embeddings are most similar to the query embedding. For example, the transformer model (108) may be a Bidirectional Encoder Representations from Transformers (BERT), a transformer-based language model.

The application computing system (110) further includes a feature impact model (111). The feature impact model (111) is a logistic regression machine learning model. As a general overview, logistic regression is a modeling technique used to estimate the probability of a binary outcome based on one or more input variables. Logistic regression may be used for classification tasks where the goal is to predict the likelihood of an event occurring, such as user conversion, based on observed features or behaviors. The model outputs a probability score between 0 and 1, which can be interpreted as the likelihood of the target event (user conversion).

Accordingly, the feature impact model (111) is configured to quantify the influence of individual in-application features of a software application offering on user conversion outcomes. The feature impact model is trained on the in-application feature usage dataset (128). Each training instance in the dataset may represent a user or session and include feature-level usage metrics and a binary conversion label indicating whether the user completed a predefined conversion event (e.g., subscription, form or financial transaction filing, purchase). The feature impact model (111) may estimate the probability of conversion as a function of the observed feature usage patterns. The resulting regression coefficients of the model provide interpretable indicators of feature impact.

The application computing system (110) further includes an LLM (112). LLMs are advanced AI systems with natural language processing capabilities, having deep neural network architectures based on the transformer model. The neural networks may contain billions of parameters, which may be trained on a vast corpora of textual data. LLMs may also be fine-tuned using enterprise proprietary data to align their outputs with domain-specific knowledge and objectives. The LLM (112) is fine-tuned on enterprise proprietary data and may be invoked to generate hypotheses by synthesizing insights from user review data and feature impact model results. Examples of LLMs include ChatGPT, Llama, Claude, etc.

The application computing system (110) further includes a feature engine (106). The feature engine (106) is software or application-specific hardware, which when executed by the computer processor, essentially performs the method of FIG. 2. The feature engine (106) controls and coordinates execution of the transformer model (108), the feature impact model (111), the LLM (112), and the feature tool (102). The feature engine (106) may further be configured to train the feature impact model (111). The feature engine (106) serves as the central computational engine of the feature tool (102). The operations performed by the feature engine are described in detail in reference to the method of FIG. 2.

Figure 3:
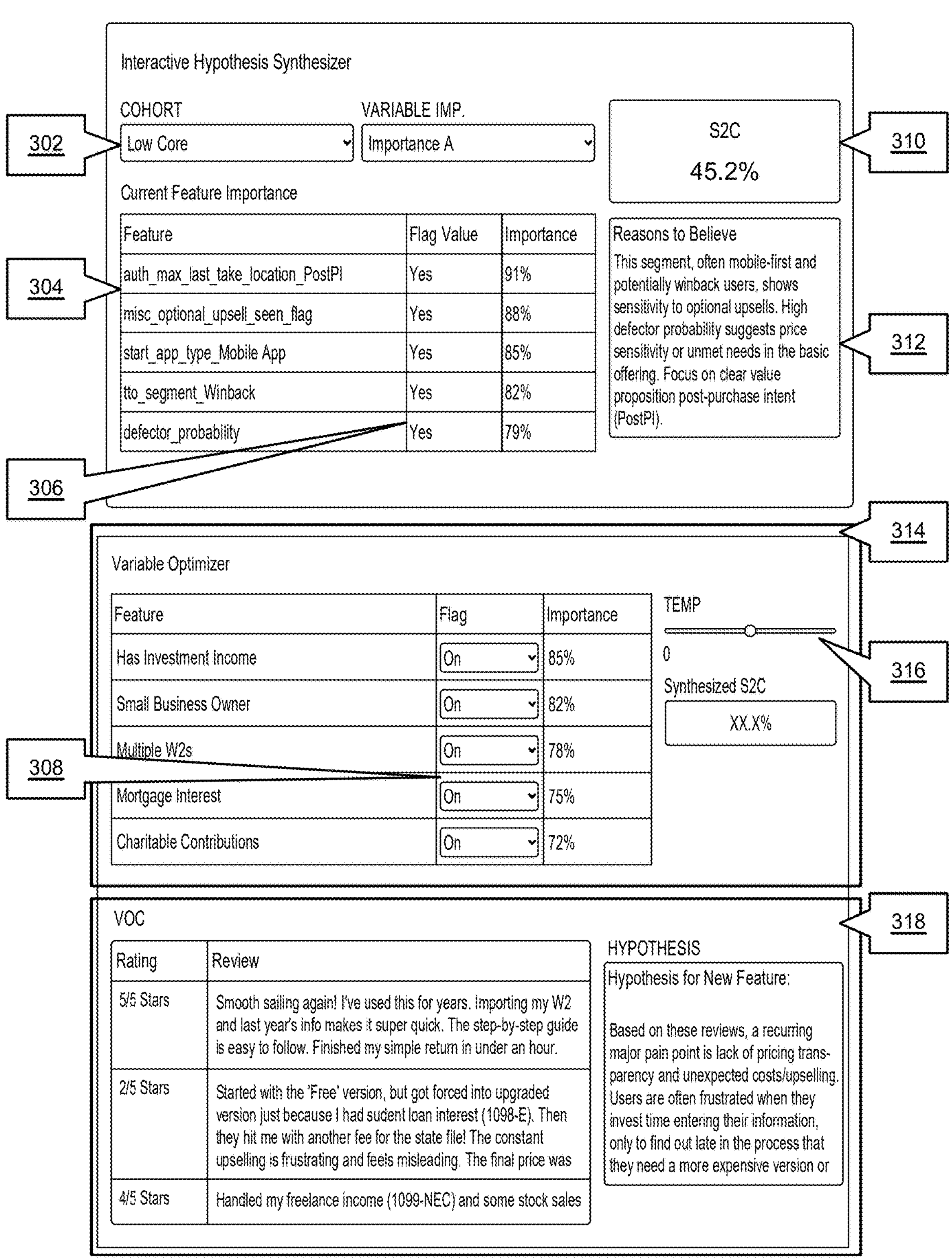
FIG. 3 shows an example of a feature dashboard, in accordance with one or more embodiments.

The application computing system (110) further includes a feature tool (102). The feature tool (102) includes a feature dashboard (103). The feature tool (102) is software or application-specific hardware configured to assist application managers in evaluating and optimizing in-application features based on feature impact on user conversion. The feature tool (102) may be configured to integrate quantitative modeling of the features from the feature impact model (111), qualitative user feedback from user review data (122), and the generated hypotheses from the LLM (112) in the feature dashboard (103). The feature tool (102) may be configured to operate in conjunction with the feature engine (106) to present updated data and insights via the feature dashboard (103). The feature dashboard (103) is a visual interface that presents the outputs of the feature impact model (111) trained on in-application feature usage data. The feature dashboard (103) may include selection features for an application manager to select a specific user cohort and view a ranked list of features based on their estimated impact on conversion of the specific user cohort. The ranked list of features may correspond to a specific section of the software application offering (e.g., a section where user data is entered, a section showing order records and status, sections for entering tax form data, etc.). The feature dashboard (103) may further include a selector feature to toggle a feature to be included in the set of features impacting the conversion. The feature dashboard (103) may further include user review data related to specific features, providing supporting evidence for the observed impact scores. An example of the feature dashboard (103) of the feature tool (102) is shown in FIG. 3.

Figure 2:
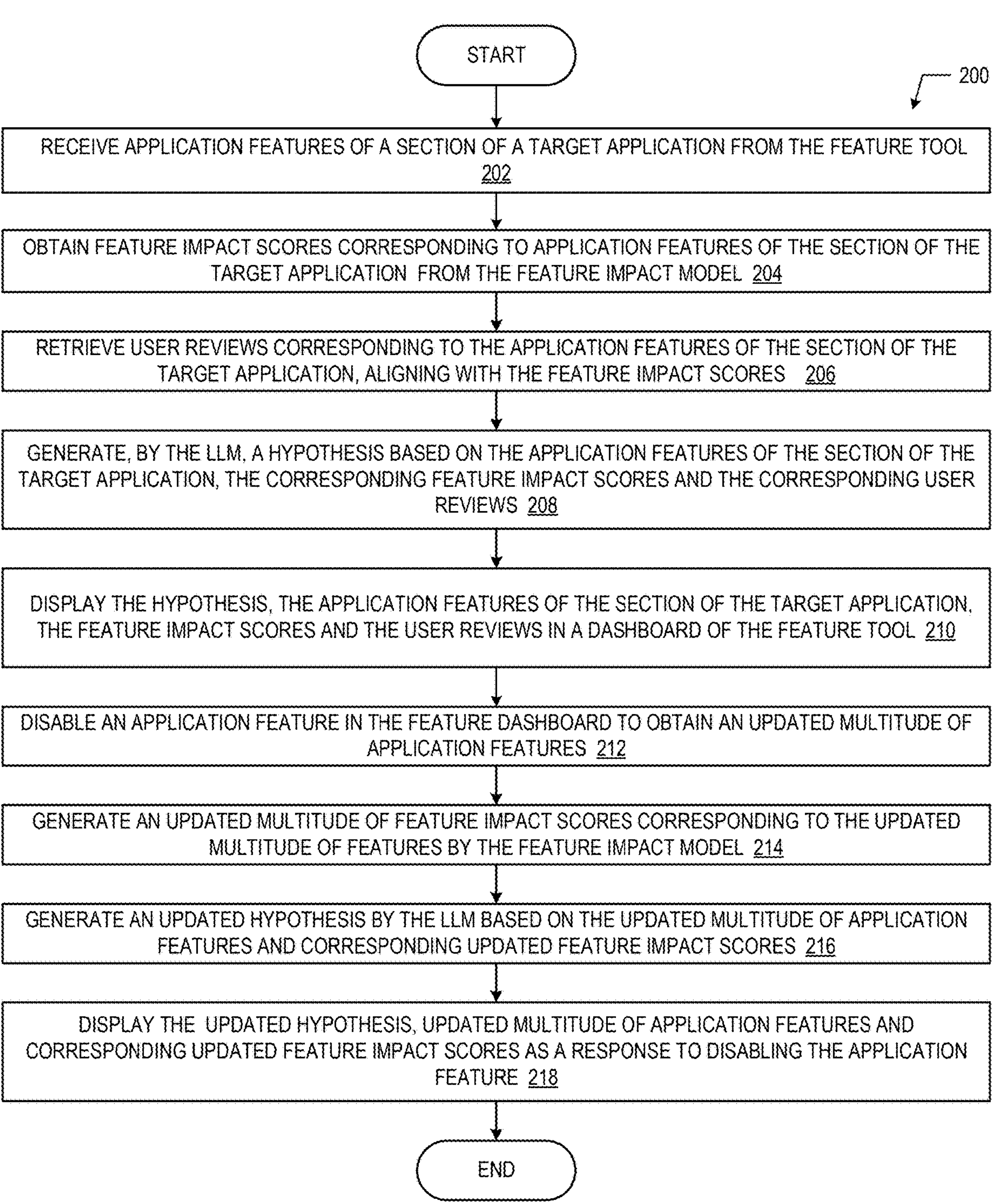
FIG. 2 shows a flowchart of a method, in accordance with one or more embodiments.

In reference to the method of FIG. 2, the term "target application" may be used to refer to a software application offering and/or software service of the enterprise being considered for experimental feature development, and/or A/B testing. The feature tool (102) may be configured to select the target application from the application catalog as the current subject of experimental feature development and/or A/B testing.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart 200 of a method for hypothesis generation and modification, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

In Block 202, application features of a section of a target application are received from the feature tool. In one or more embodiments, the feature tool may identify a multitude of application features of the section of the target application.

The feature engine may receive the application features of the section of the target application being considered for experimental feature development. A section of a target application refers to a logically distinct part of a software interface that guides a user through a specific subset of steps of a (multi-step) process. The multi-step process may constitute a user journey. Each section may be associated with a particular functional objective within the overall user journey, such as data entry, verification, or decision-making. Thus, in one or more embodiments, the section of the target application may include feature usage data corresponding to a section of a user journey of the user application. The user journey may terminate in an end state. The end state may include one of a conversion, or an abandonment.

The application features of a section may include features of the target application in the particular section under consideration. Application features of a section are discrete, interactive elements or functionalities presented to the user within a given section of the target application. Application features of a section may be designed to facilitate user interaction and data collection. Further, the application features of the section may be directly or indirectly related to the primary function, or purpose of the section. The application features of the section may include input fields, selection menus, prompts, tooltips, validation mechanisms, or auxiliary content, such as upsell offers or help dialogs.

Thus, the application features may include structured information collected or derived from user interactions with the features of a section. The structured information may include feature identifiers, metadata (e.g., feature name, type, location within the section), and usage metrics (e.g., frequency of interaction, time spent, completion status). The structured information may further include feature configuration flags (e.g., enabled/disabled, visible/hidden), contextual attributes (e.g., device type, session duration, user cohort), etc.

The application features may be received by the feature engine. The section data may serve as the basis for evaluating the impact of individual features on user behavior in relation to conversion outcomes.

In Block 204, feature impact scores corresponding to application features of the section of the target application are obtained from the feature impact model. In one or more embodiments, a multitude of feature impact scores may be generated for the multitude of application features. The multitude of feature impact scores may each represent a corresponding impact of a respective feature of the multitude of application features on a conversion of a user journey of the target application. In one or more embodiments, the multitude of feature impact scores may be respective regression coefficients representing the relative contribution of respective application features of the multitude of application features to a likelihood of conversion of the user journey of the target application. In one or more embodiments, a set of regression coefficients may be obtained from a feature impact model. The feature impact model may be a trained feature impact model. The set of regression coefficients may represent respective relative contributions of each application feature of the multitude of application features to a probability of the conversion. Further, respective regression coefficients of the set of regression coefficients may be assigned as feature impact scores corresponding to respective application features of the multitude of application features, to obtain the multitude of feature impact scores.

In one or more embodiments, the feature impact model may be a trained feature impact model. Specifically, the feature impact model may be trained on diverse in-application feature datasets of diverse software application offerings/software services of the application catalog. In a training phase, a first step may be to select a feature usage dataset corresponding to the multitude of application features of the section of the user journey. Accordingly, the first step may entail identifying and retrieving the feature usage dataset that captures user interaction data specific to the section of a target software application. In other words, the overarching feature usage dataset may include records of user interactions with application features during their engagement with the application. The records may include binary indicators of whether a feature was used, timestamps of interaction, and contextual metadata, and binary indicators of whether the user journey resulted in a conversion. The overarching feature usage dataset may be filtered or segmented to correspond specifically to the application features within the selected section.

Once the relevant dataset is selected, a multitude of feature vectors based on the feature usage dataset may be constructed. Each feature vector of the multitude of feature vectors may include a first binary indicator representing a user interaction of a corresponding application feature of the plurality of application features. Each feature vector may further include a second binary indicator representing the conversion of the user journey of the target application. For example, the first binary indicator may represent whether a user interacted with a particular application feature (e.g., “1” for interaction, “0” for no interaction). The second binary indicator may represent whether the user journey in which the interaction with the particular application feature was included, resulted in a conversion outcome, such as completing a transaction, or reaching a final screen. The feature vectors may serve as structured input data for training the feature impact model. By encoding both feature usage and conversion outcomes, the feature vectors may cause the model to learn patterns that associate specific feature interactions with successful user outcomes.

The constructed feature vectors may serve as input instances in training the feature impact model. The feature impact model may be trained using the multitude of feature vectors. The model is trained to estimate a probability of conversion based on the presence or absence of interactions with each application feature. During training, the feature impact model may learn a set of regression coefficients. The regression coefficients may represent respective relative contributions of each application feature of the multitude of application features to a probability of the conversion of the user journey of the target application. Specifically, the regression coefficients quantify the contribution of each application feature in the particular section of the target application to the likelihood of conversion. A positive coefficient is indicative that interaction with the feature increases the probability of conversion, while a negative coefficient suggests a negative influence. The magnitude of the coefficient reflects the strength of the feature’s impact. Thus, the trained feature analysis model may provide interpretable, quantitative insights into which application features within the section of the target application are most influential in driving conversion.

In Block 206, user reviews corresponding to the application features of the section of the target application are retrieved. Notably, the user reviews are selectively retrieved. The selected user reviews may align with the feature impact scores. In other words, positive user reviews may be selected for feature impact scores having high positive magnitudes. In one or more embodiments, the feature engine may invoke the transformer model to retrieve a multitude of user reviews of the multitude of application features. In one or more embodiments, invoking the transformer model may entail retrieving user review data including positive sentiment associated with the application feature. The retrieval of user review data including positive sentiment may be responsive to a regression coefficient corresponding to an application feature of the multitude of application features being positive. In one or more embodiments, invoking the transformer model may entail retrieving user review data including negative sentiment associated with the application feature. The retrieval of user review data including negative sentiment may be responsive to a regression coefficient corresponding to the application feature of the multitude of application features being negative.

To retrieve user review data, the feature engine may construct a query directed to the transformer model. The query may encapsulate the identity of the particular application feature and the direction of the corresponding feature impact score of the particular application feature. For example, for an application feature with a high positive feature impact score, the query may be phrased as “Retrieve positive user reviews about feature X that describe how it aided in the user completing the task or improving the experience.” Conversely, for an application feature with a high negative feature impact score, the query may be phrased as “Retrieve negative user reviews about feature Y that describe abandonment of the user journey.” The constructed query may be programmatically provided to the transformer model. The transformer model may encode the query into an embedding and perform a similarity search of the query against the stored embeddings of user reviews. The transformer model may further retrieve a ranked list of reviews that are semantically aligned with the query. The semantic alignment may be based on both the topic (i.e., the application feature) and the sentiment or qualitative tone (positive or negative), corresponding to the direction of the feature impact score. Furthermore, the retrieved reviews may be filtered by the feature engine, based on relevance thresholds or metadata (e.g., application version, user cohort) and aggregated to form a representative sample of user sentiment for each feature.

In Block 208, a hypothesis based on the application features of the section of the target application, the corresponding feature impact scores, and the corresponding user reviews is generated by the LLM. In one or more embodiments, the LLM may process the multitude of feature impact scores, the multitude of user reviews to generate the hypothesis of the impact of an application feature of the multitude of application features on the conversion (of the user journey). Thus, the LLM may generate a hypothesis that specifies individual application features and postulates the quantitative impact and qualitative feedback of the individual application features on the conversion. In one or more embodiments, the feature engine may construct a prompt to the LLM. The prompt may include the multitude of application features, the multitude of feature impact scores, and the plurality of user reviews as input. The prompt may further include an instruction to generate the hypothesis based on the input. The LLM may further process the prompt, to generate the hypothesis.

In one or more embodiments, the LLM may generate the hypothesis explaining the influence of individual application features on user conversion by synthesizing both quantitative and qualitative inputs. The prompt may include a multitude of application features associated with a specific section of the target application. The prompt may further include the corresponding feature impact scores that quantify each application feature’s contribution to conversion as determined by the feature impact model. The prompt may further include a multitude of user reviews that are retrieved using the transformer model and are semantically aligned with each application feature’s positive or negative regression coefficient (i.e., feature impact score) to reflect user sentiment. The prompt may also include an instruction directing the LLM to generate a hypothesis that integrates these inputs.

The LLM may process the prompt by associating each application feature’s feature impact score with the sentiment and themes expressed in the corresponding user reviews. For example, a high positive impact score may be paired with positive reviews that highlight ease of use, helpfulness, or satisfaction with the feature, while a high negative impact score may be paired with negative reviews that describe confusion, frustration, or unmet expectations. Using this alignment, the LLM may generate a hypothesis that includes quantitative reasoning, such as identifying which features are statistically most influential in driving or hindering conversion. The hypothesis may further include qualitative insights, such as recurring pain points, user preferences, or emotional responses extracted from the reviews.

The resulting hypothesis may include sections such as a “Validating reviews” narrative, for example: “This segment, often mobile-first and potentially winback users, shows sensitivity to optional upsells. High defector probability suggests price sensitivity or unmet needs in the basic offering.” Another section may summarize user sentiment, such as: “Based on these reviews, a recurring major pain point is lack of pricing transparency and unexpected costs/upselling. Users are often frustrated when they invest time entering their information, only to find out late in the process that they need a more expensive version.”

In Block 210, the hypothesis, the application features of the section of the target application, the feature impact scores, and the user reviews are displayed. In one or more embodiments, the aforementioned outputs are displayed in the feature dashboard of the feature tool.

Blocks 202-210 of the method of FIG. 2 detail the process of setting up a “baseline” of the features of a section of a target application, and obtaining a baseline hypothesis for experimental feature development. The baseline may serve as an initial analysis of features and resulting hypotheses, for application managers to review in the feature tool. The baseline may further provide a consolidated, holistic, quantitative view of the impact of an application feature on a conversion outcome of a user journey of the target application. Subsequent to obtaining the baseline features and hypothesis, the feature tool may perform manipulation of the application feature set of the particular section. For example, a feature may be turned “on” or enabled, or turned “off” or disabled. In the initial baseline view, in certain embodiments, all features may be considered to be enabled. Thus, a subset of the multitude of application features may be selected by disabling certain features, the remaining enabled features may serve as the subset of application features. Based on this subset, the hypothesis may be revised, modified, and updated on the feature dashboard.

Accordingly, in Block 212, an application feature is disabled in the feature dashboard to obtain an updated multitude of application features. In one or more embodiments, the feature dashboard may include a feature to toggle an application feature from an enabled state to a disabled state.

In Block 214, an updated multitude of feature impact scores corresponding to the updated multitude of features is generated by the feature impact model. In one or more embodiments, when an application feature is disabled, the binary indicator corresponding to the application feature changes. (e.g., from 1 to 0). The feature analysis model may then recalculate the conversion probability using the existing coefficients, to obtain an estimated impact on conversion without retraining the feature analysis model. In one or more embodiments, obtaining an updated plurality of feature impact scores may entail constructing an updated multitude of feature vectors corresponding to an updated multitude of application features. The updated multitude of application features may be obtained by disabling an application feature of the multitude of application features in the feature dashboard.

Further, the feature impact model may compute an updated conversion probability, based on the updated multitude of feature vectors, and regression coefficients of the feature impact model. The regression coefficients may correspond to the (original) multitude of application features. For example, let an original feature vector include binary indicators for features {F1, F2, F3}, all set to 1 (enabled), and let the corresponding regression coefficients be {C1, C2, C3}. The predicted conversion probability may be computed using the logistic function applied to the weighted sum: F1*C1+F2*C2+F3*C3. If feature F2 is disabled (i.e., its value is set to 0), the modified feature vector becomes {F1=1, F2=0, F3=1}, and the weighted sum becomes F1*C1+0*C2+F3*C3. In this case, the contribution of F2 to the conversion probability is effectively removed. The resulting change in the predicted conversion probability reflects the isolated impact of removing F2, given that the regression coefficients remain fixed. Notably, the regression coefficients may not be modified unless the model is retrained. However, the change in the predicted conversion probability due to toggling a feature provides an estimate of that feature's influence on conversion in the context of the current feature analysis model.

Further, in one or more embodiments, updated feature impact scores corresponding to respective features of an updated plurality of application features may be determined. The updated feature impact scores are determined by a difference in conversion probabilities between respective updated feature vectors of the updated multitude of feature vectors and respective original feature vectors of an original multitude of feature vectors. The original multitude of feature vectors may correspond to the (original) multitude of application features. The multitude of updated feature impact scores may be obtained in this manner.

In Block 216, an updated hypothesis is generated by the LLM based on the updated multitude of application features and corresponding updated feature impact scores. In one or more embodiments, the LLM may receive, as input, the updated application feature configuration (e.g., with the features enabled or disabled), the updated feature impact scores computed by the regression model, and previously retrieved user review data relevant to the affected features. The LLM may further compare the updated feature impact scores with the original feature impact scores and identify changes in the predicted conversion outcome. The LLM may further generate a new hypothesis that reflects the updated application feature configuration and corresponding influence on the conversion outcome. The updated hypothesis may replace the original hypothesis to reflect the updated multitude of application features.

Continuing with the previous example, let the feature vector be {F1=1, F2=1, F3=1}, indicating that all three features are enabled for a given user. Let the corresponding regression coefficients be {C1=+0.8, C2=−0.6, C3=+0.5}, where each coefficient represents the contribution of the respective feature to the predicted probability of conversion. The original conversion probability may be computed using the logistic function applied to the weighted sum of the feature values and their coefficients, namely: (F1×C1)+(F2×C2)+(F3×C3)=(1×0.8)+(1×−0.6)+(1×0.5)=0.7. The original hypothesis may be "While F1 and F3 contribute positively to conversion, F2 appears to reduce conversion, possibly due to user frustration with upsell prompts, as reflected in user reviews." Now, let feature F2 be disabled. The updated feature vector becomes {F1=1, F2=0, F3=1}. The updated weighted sum is: (1×0.8)+(0×−0.6)+(1×0.5)=1.3. The increase in the weighted sum results in a higher predicted conversion probability. Based on this change, the LLM may generate an updated hypothesis that reflects the removal of F2 and its effect on conversion. For example, the updated hypothesis may state "With F2 removed, the predicted conversion rate improves. User feedback indicates that users found F2 distracting or unnecessary, supporting the observed increase in conversion when this feature is excluded."

In Block 218, the updated hypothesis, updated a multitude of application features and the corresponding updated feature impact scores are displayed as a response to disabling the application feature. In one or more embodiments, a subset of application features may be disabled in the step of Block 212, to obtain corresponding modifications to the hypothesis.

FIG. 3 shows an example of a feature dashboard, in accordance with one or more embodiments. The following example is for explanatory purposes only and not intended to limit the scope of one or more embodiments.

The feature dashboard shown in FIG. 3 is the visual interface of a feature tool. The feature tool is an interactive software system designed to assist application managers in evaluating and optimizing in-application features based on their impact on user conversion. The feature tool integrates quantitative modeling, qualitative user feedback, and natural language generation to support hypothesis-driven experimental development.

The feature dashboard presents the outputs of a logistic regression model trained on in-application feature usage data. The dashboard includes an interactive hypothesis synthesizer. This module is used by the application manager to select a specific user cohort (302) and view a ranked list of features based on their estimated impact on conversion (shown as S2C). Each feature (304) is displayed with its corresponding flag value (306) (e.g., "Yes"/"No") and an importance score (feature impact score) derived from the regression model coefficients. The interactive hypothesis synthesizer further displays a generated hypothesis that combines the quantitative feature impact with qualitative insights from user reviews. The feature dashboard further includes a variable optimizer (314). The variable optimizer may be used by an application manager to simulate changes to feature configurations using toggle switches (308). Each toggle represents the inclusion or exclusion of a feature (e.g., turning "Has Investment Income" on or off). The system updates the projected conversion impact, shown as S2C score (310) based on the logistic regression model's coefficients. A temperature control slider (316) allows the user to adjust the creativity or variability of the generated hypotheses. The feature dashboard further includes a section showing voice-of-customer (VOC) integration (that is, integration with user review data) (318). Here, user review data related to specific features are retrieved and summarized. The (qualitative) user reviews are aligned with the features identified by the regression model to provide supporting evidence, shown as "reasons to believe", i.e., validating reviews (312) for the observed feature impact scores. The feature dashboard further includes a synthesized S2C score display. The current Success-to-Conversion (S2C) score is displayed in this section, which represents the predicted conversion rate for the selected cohort and feature configuration.

The feature dashboard facilitates iterative experimental feature development by modifying feature flags, observing projected changes in conversion, and receiving updated hypotheses generated by the LLM. The LLM synthesizes the regression model output and VOC summaries to produce hypotheses of why specific features may influence user behavior. This integrated approach enables data-driven decision-making in-application development by combining statistical modeling, user sentiment analysis, and AI-generated insights in a unified interface.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 4A, 4B:
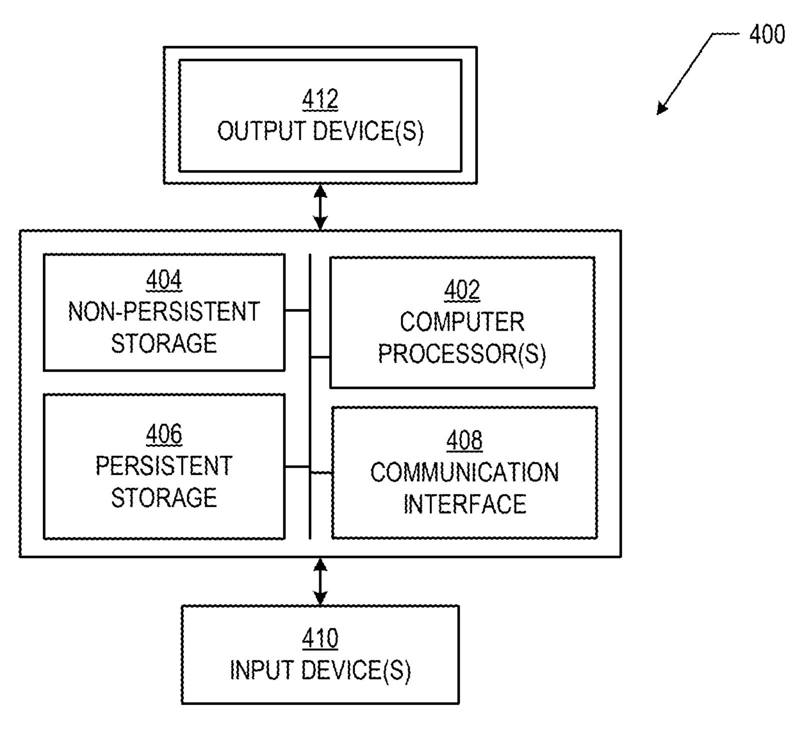
FIGS. 4A and 4B show a computing system, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or micro-cores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

identifying a plurality of application features of a section of a target application;

selecting a feature usage dataset corresponding to the plurality of application features of the section of the target application;

constructing a plurality of feature vectors based on the feature usage dataset, wherein each feature vector of the plurality of feature vectors comprises a first binary indicator representing a user interaction of a corresponding application feature of the plurality of application features, and a second binary indicator representing a conversion of a user journey of the target application;

training a feature impact model using the plurality of feature vectors, wherein the feature impact model learns a set of regression coefficients representing respective relative contributions of each application feature of the plurality of application features to a probability of the conversion of the user journey of the target application to obtain a trained feature impact model;

generating, by the trained feature impact model, a plurality of feature impact scores for the plurality of application features, wherein the plurality of feature impact scores each represent a corresponding impact of a respective feature of the plurality of application features on the conversion of the user journey of the target application;

retrieving a plurality of user reviews of the plurality of application features;

processing, by a large language model (LLM), the plurality of feature impact scores and the plurality of user reviews to generate a hypothesis of impacts of respective application features of the plurality of application features on the conversion;

displaying the hypothesis, the plurality of application features, and the plurality of feature impact scores in a feature dashboard of a feature tool;

receiving, from the feature dashboard, a modified feature flag excluding an application feature;

updating by the LLM, the hypothesis to exclude a corresponding impact of the application feature to obtain an updated hypothesis; and displaying the updated hypothesis in the feature dashboard.

2. The method of claim 1, further comprising:

disabling a second application feature of the plurality of application features, to obtain an updated plurality of application features;

obtaining an updated plurality of feature impact scores corresponding to the updated plurality of application features;

generating, by the LLM, a second updated hypothesis of impacts of respective application features of the updated plurality of application features on the conversion, based on the updated plurality of feature impact scores and the plurality of user reviews; and displaying the second updated hypothesis as a response to disabling the second application feature.

3. The method of claim 1, wherein the plurality of feature impact scores comprises respective regression coefficients representing a relative contribution of respective application features of the plurality of application features to a likelihood of the conversion of the user journey of the target application.

4. The method of claim 1, wherein the section of the target application comprises feature usage data corresponding to the section of the user journey of the target application, wherein the user journey terminates in an end state, the end state comprising the conversion.

5. The method of claim 1, wherein generating the plurality of feature impact scores further comprises:

obtaining a set of regression coefficients from the trained feature impact model, wherein the set of regression coefficients represents respective contributions of each application feature of the plurality of application features to a probability of the conversion; and assigning respective regression coefficients of the set of regression coefficients as feature impact scores corresponding to respective application features of the plurality of application features, to obtain the plurality of feature impact scores.

6. The method of claim 1, further comprising:

obtaining an updated plurality of feature impact scores, by performing operations comprising:

constructing an updated plurality of feature vectors corresponding to an updated plurality of application features, wherein the updated plurality of application features is obtained by disabling a second application feature of the plurality of application features, and computing, by the trained feature impact model, an updated conversion probability, based on the updated plurality of feature vectors, and regression coefficients of the trained feature impact model, wherein the regression coefficients correspond to the plurality of application features.

7. The method of claim 1, further comprising:
determining updated feature impact scores corresponding to respective features of an updated plurality of application features, based on a difference in conversion probabilities between respective updated feature vectors of an updated plurality of feature vectors and respective original feature vectors of an original plurality of feature vectors,
wherein the original plurality of feature vectors corresponds to the plurality of application features,
to obtain a plurality of updated feature impact scores.

8. The method of claim 1, wherein retrieving the plurality of user reviews further comprises:
responsive to a regression coefficient corresponding to a second application feature of the plurality of application features being positive,
retrieving user review data comprising positive sentiment associated with the second application feature.

9. The method of claim 1, wherein retrieving the plurality of user reviews further comprises:
responsive to a regression coefficient corresponding to a second application feature of the plurality of application features being negative,
retrieving user review data comprising negative sentiment associated with the second application feature.

10. The method of claim 1, wherein generating the hypothesis further comprises:
constructing a prompt to the LLM, comprising:
the plurality of application features, and the plurality of feature impact scores, and the plurality of user reviews as input, and
an instruction to generate the hypothesis based on the input; and
processing, by the LLM, the prompt, to generate the hypothesis.

11. A system, comprising:
a computer processor;
a feature tool, executing on the computer processor;
a large language model (LLM), executing on the computer processor;
a transformer model, executing on the computer processor;
a feature impact model, executing on the computer processor; and
a feature engine, executing on the computer processor, and configured to perform operations comprising:
receiving, from the feature tool, a plurality of application features identified from a section of a target application,
selecting a feature usage dataset corresponding to the plurality of application features of the section of the target application,
constructing a plurality of feature vectors based on the feature usage dataset, wherein each feature vector of the plurality of feature vectors comprises a first binary indicator representing a user interaction of a corresponding application feature of the plurality of application features, and a second binary indicator representing a conversion of a user journey of the target application,
training the feature impact model using the plurality of feature vectors, wherein the feature impact model learns a set of regression coefficients representing respective relative contributions of each application feature of the plurality of application features to a probability of the conversion of the user journey of the target application to obtain a trained feature impact model,
causing the trained feature impact model to generate a plurality of feature impact scores for the plurality of application features, wherein the plurality of feature impact scores each represent a corresponding impact of a respective feature of the plurality of application features on the conversion of the user journey of the target application,
causing the transformer model to retrieve a plurality of user reviews of the plurality of application features,
causing the LLM to process the plurality of feature impact scores and the plurality of user reviews to generate a hypothesis of impacts of respective application features of the plurality of application features on the conversion,
causing the feature tool to display the hypothesis, the plurality of application features, and the plurality of feature impact scores in a feature dashboard of the feature tool,
receiving, from the feature dashboard, a modified feature flag excluding an application feature,
updating by the LLM, the hypothesis to exclude a corresponding impact of the application feature to obtain an updated hypothesis, and
displaying the updated hypothesis in the feature dashboard.

12. The system of claim 11, wherein the feature tool is further configured to disable a second application feature of the plurality of application features, to obtain an updated plurality of application features; and
the feature engine is further configured to:
obtain, from the trained feature impact model, an updated plurality of feature impact scores corresponding to the updated plurality of application features,
cause the LLM to generate a second updated hypothesis of impacts of respective application features of the updated plurality of application features on the conversion, based on the updated plurality of feature impact scores and the plurality of user reviews, and
cause the feature tool to display the second updated hypothesis in the feature dashboard as a response to disabling the application features.

13. The system of claim 11, wherein generating the plurality of feature impact scores further comprises:
obtaining, by the feature engine, a set of regression coefficients from the trained feature impact model, wherein the set of regression coefficients represents respective contributions of each application feature of the plurality of application features to a probability of the conversion; and
assigning, by the feature engine, respective regression coefficients of the set of regression coefficients as feature impact scores corresponding to respective application features of the plurality of application features, to obtain the plurality of feature impact scores.

14. The system of claim 11, wherein the feature engine is further configured to:
obtain an updated plurality of feature impact scores, by performing operations comprising:
constructing an updated plurality of feature vectors corresponding to an updated plurality of application features, wherein the updated plurality of application features is obtained by disabling the application feature of the plurality of application features, and causing the trained feature impact model to compute an updated conversion probability, based on the updated plurality of feature vectors, and regression coefficients of the feature impact model, wherein the regression coefficients correspond to the plurality of application features, wherein the feature impact model is previously trained.

15. The system of claim 11, wherein the feature engine is further configured to:

determine updated feature impact scores corresponding to respective features of an updated plurality of application features, based on a difference in conversion probabilities between respective updated feature vectors of an updated plurality of feature vectors and respective original feature vectors of an original plurality of feature vectors, wherein the original plurality of feature vectors corresponds to the plurality of application features, to obtain a plurality of updated feature impact scores.

16. The system of claim 11, wherein retrieving the plurality of user reviews further comprises:

responsive to a regression coefficient corresponding to a second application feature of the plurality of application features being positive, retrieving user review data comprising positive sentiment associated with the second application feature; and responsive to the regression coefficient corresponding to the second application feature of the plurality of application features being negative, retrieving user review data comprising negative sentiment associated with the second application feature.

17. The system of claim 11, wherein generating the hypothesis further comprises:

constructing a prompt to the LLM, comprising:

the plurality of application features, and the plurality of feature impact scores, and the plurality of user reviews as input, and an instruction to generate the hypothesis based on the input; and processing, by the LLM, the prompt, to generate the hypothesis.

18. A method, comprising:

obtaining a plurality of application features of a section of a target application;

transmitting the plurality of application features to a feature engine;

receiving, from the feature engine, a plurality of feature impact scores for the plurality of application features, wherein the plurality of feature impact scores each correspond to respective regression coefficients representing a relative contribution of respective application features of the plurality of application features to a probability of conversion of a user journey of the target application;

receiving, from the feature engine, a plurality of user reviews of the plurality of application features;

receiving, from the feature engine, a generated hypothesis of an impact of an application feature of the plurality of application features on the conversion;

displaying the generated hypothesis, the application feature and a corresponding feature impact score, and the plurality of user reviews in a feature dashboard;

obtaining an updated plurality of application features of the section of the target application, wherein at least one application feature is disabled;

transmitting the updated plurality of application features to the feature engine;

receiving, from the feature engine, an updated plurality of feature impact scores corresponding to the updated plurality of application features;

receiving, from the feature engine, an updated hypothesis of impacts of respective application features of the updated plurality of application features on the conversion; and displaying the updated hypothesis in the feature dashboard as a response to disabling the at least one application feature.

* * * * *